Patented Oct. 19, 1948

2,451,611

UNITED STATES PATENT OFFICE 2,451,611

PREPARATION OF 4-ALKYL-QUINOLINES

Kenneth Nielsen Campbell, South Bend, Ind., assignor to E. I. du Pont de Nemours & Company, Wilmington, Del., a corporation of Delaware No Drawing. Application August 9, 1944, Serial No. 548,788

7 Claims. (Cl. 260—283)

This invention relates to a novel method for preparing 4-alkyl-quinolines as typified by lepidine and related compounds which are useful as intermediates in the synthesis of pharmaceuticals.

It is an object of this invention to provide a new synthesis for 4-alkyl-quinolines whereby the same may be obtained from readily-available materials hitherto not employed for this synthesis. A further object is to provide a process for the above purpose characterized by simplicity of operation and good yields. Other and further important objects of this invention will appear as the description proceeds.

According to this invention, 4-alkyl-quinolines may be synthesized by condensing a primary arylamine of the benzene or naphthalene series with a compound of the general formula

R—O—CH₂—CH₂—X—R′ wherein R and R′ are alkyl radicals and X is a radical selected from the group consisting of

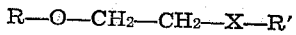

Alk being an alkyl radical. It will be noted that the link X is a carbon atom having its two free valences satisfied by attachment to oxygen. When X is CO, the compound is a ketone and may be defined as a 1-alkoxy-alkane-3-one, as typified by 1-methoxy-butane-3-one:

CH₃—O—CH₂—CH₂—CO—CH₃

When X is C(O—Alk)₂, the compound is a 1,3,3-trialkoxy-alkane and may be typified by 1,3,3-trimethoxy-butane:

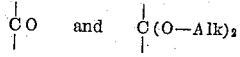

The condensation taking place may be typified by the following equation:

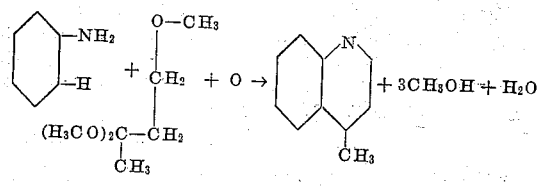

It will be clear that one atom of oxygen is consumed in the reaction and this may be supplied by the atmosphere as the reagents are refluxed together, or it may be derived from an oxidizing agent added to the reaction. I find that highest yields are obtained by using ferric chloride as an oxidizing agent. This one may be anhydrous or in the form of a hydrate, for instance its hexahydrate.

Additional improvements in yield result if the arylamine is selected in the form of a hydrohalide, for instance the hydrochloride, although additional quantities of free amine may be present in the reaction mass. Where no free amine is employed, it is best to use an excess of the arylamine-hydrochloride, say 125% of theory with respect to the quantity of trialkoxy-alkane or alkoxy-alkanone employed.

The reaction is also improved slightly by using condensing agents such as zinc-chloride, boron trifluoride, or an excess of ferric chloride. These need not be employed in more than catalytic quantities, say up to 0.1 mole per mole of the trialkoxy-alkane compound.

The reaction is preferably carried out in the presence of a solvent, and this may be alcohol, preferably ethyl or methyl, either anhydrous or 95%.

Without limiting my invention, the following examples, in which parts mentioned are by weight, will serve to illustrate my preferred mode of operation.

*Example 1.—Lepidine from 1,3,3-trimethoxy-butane*

80.9 parts (0.625 mole) of aniline hydrochloride, 270 parts (1.0 mole) of ferric chloride hexahydrate, 10 parts of anhydrous zinc chloride, and 365 parts of 95% ethyl alcohol are charged into a vessel equipped with a reflux condenser. The mixture is heated to an inside temperature of 55°–75° C. and 74.0 parts (0.5 mole) of 1,3,3-trimethoxybutane are added slowly over a period of 1 to 1.5 hours. The solution is then refluxed for 1.5 to 2 hours, and allowed to stand overnight. The alcohol is removed by distillation until 320–340 parts are collected, and 150 parts of water are added to the residue. The mixture is stirred and cooled, and made strongly basic by the addition of strong sodium hydroxide solution (25–40%), while the temperature is kept below 25° C. The mixture is concentrated by distillation, and is then heated in an oil bath at 225°–250° C., while superheated steam at 225–250° C. is passed in. The organic layer in the distillate is separated; the aqueous layer is saturated with salt and extracted twice with ether. The extracts and organic layer are combined and dried over magnesium sulfate. The ether is removed by distillation and the residue is fractionally distilled. The yield of lepidine is 52.7 parts, which is equivalent to 73% of the theoretical; B. P. 90–95°/1.5–2 mm.; $n_D^{20}$=1.6185–1.6195; $d_4^{20}$=1.0826.

Steam at 100° C. can be used in the above procedure for the isolation of the lepidine, but under these conditions a much larger volume of distillate is collected.

*Example 2.—Lepidine from 1-methoxybutanone-3*

The procedure is the same as described above, the following reagents and amounts being used: 40.4 parts (0.313 mole) of aniline hydrochloride, 135 parts (0.5 mole) of ferric chloride hexahydrate, 5 parts of anhydrous zinc chloride, 182 parts of 95% ethyl alcohol and 25.5 parts (0.25 mole) of 1-methoxybutanone-3. The yield of lepidine is 67% of the theoretical.

*Example 3.—4,6-dimethylquinoline from 1,3,3-trimethoxybutane*

The procedure is the same as under Example 1 above, the following reagents and quantities being employed: 44.7 parts (0.313 mole) of p-toluidine hydrochloride, 135 parts of ferric chloride hexahydrate, 5 parts of anhydrous zinc chloride, 182 parts of 95% ethyl alcohol, and 37.0 parts (0.25 mole) of 1,3,3-trimethoxybutane. The yield of 4,6-dimethylquinoline is 65% of the theoretical; B. P.=103–106°/2.5 mm.; $n_D^{20}$=1.6080–1.6095; $d_4^{20}$=1.0577.

*Example 4.—8-chlorolepidine from 1,3,3-trimethoxybutane*

The procedure is the same as described above, the following reagents and quantities being used: 51.3 parts of o-chloroaniline hydrochloride, 135 parts of ferric chloride hexahydrate, 5 parts of anhydrous zinc chloride, 182 parts of 95% ethyl alcohol, and 37.0 parts of 1,3,3-trimethoxybutane. The product is isolated by distillation with superheated steam and is obtained as white crystals, insoluble in water; when recrystallized from high boiling ligroin it has a M. P. of 106–107.5° C.

*Example 5.—Benzolepidine from 1,3,3-trimethoxybutane*

The procedure is the same as described above, the following reagents and quantities being used: 56.0 parts of beta-naphthylamine hydrochloride, 135 parts of ferric chloride hexahydrate, 5 parts of anhydrous zinc chloride, 182 parts of 95% ethyl alcohol, and 37.0 parts of 1,3,3-trimethoxybutane. The product is isolated by distillation with superheated steam; after recrystallization from high boiling ligroin it has a M. P. of 95–98° C.

*Example 6.—6-methoxylepidine from 1,3,3-trimethoxybutane*

The same procedure as described above was used, with the following reagents and amounts: 99.6 parts (0.625 mole) of p-anisidine hydrochloride, 270 parts (1.0 mole) of ferric chloride hexahydrate, 10 parts of anhydrous zinc chloride, 365 parts of 95% ethyl alcohol, and 74.0 parts (0.5 mole) of 1,3,3-trimethoxybutane. The product was isolated by distillation with superheated steam at 225–250° C. Fractionation of the ether extracts and organic layer of the steam distillate yielded a lower-boiling fraction (B. P. 93–95°/2 mm.) which was shown to be p-anisidine; then a higher-boiling fraction, B. P. 121–123°/2 mm., M. P. 28–32°, which was 6-methoxylepidine. The yield was 45.0 parts, or 52% of theory. The 6-methoxylepidine so obtained is the anhydrous form; it can be converted to the stable, crystalline hydrate, M. P. 50–52°, by treatment with water or dilute alcohol.

*Example 7.—6-methoxylepidine from 1,3,3-trimethoxybutane*

The synthesis was the same as in Example 6, but instead of distillation with superheated steam, the product was isolated as follows: At the end of the reaction, most of the alcohol was distilled off and about 100 parts of water were added to the residue, which was then made strongly basic by treatment with 25% sodium hydroxide solution. The material was then evaporated to dryness on a water bath under reduced pressure, using an air-bubbler. The last traces of water were removed by adding alcohol and evaporating, repeating if necessary. The hard cake thus obtained was thoroughly triturated with benzene or ether, several times. The dark-colored extracts so obtained were concentrated and the residue distilled in vacuo. The yield of 6-methoxylepidine of B. P. 132–135°/4 mm., was 52%.

The above alternative procedure may be advantageously applied also to the isolation of other difficultly volatile lepidines.

*Example 8.—Lepidine from crude trimethoxybutane solution and using boron trifluoride as condensing agent*

Boron trifluoride was passed into 158 parts of absolute alcohol until the gain in weight was 7 parts. To this solution were then added: 80.9 parts of aniline hydrochloride, and 270 parts of ferric chloride hexahydrate. The mixture was heated to 60° C. (inside temperature), and 74 parts of trimethoxybutane (in the form of the crude filtered 18% solution in methanol resulting from the treatment of monovinyl acetylene with an excess of methanol in the presence of a mercury-boron trifluoride catalyst) was added dropwise over a period of two and a half hours. The reaction mixture was stirred and refluxed for an additional hour and a half. Alcohol was distilled until about 300 parts had been collected, and the residue was made basic by addition of 40% sodium hydroxide solution. The alkaline mixture was steam distilled; the distillate was saturated with salt and extracted with ether. Distillation of the ether extracts yielded 33.3 parts of lepidine, B. P.=103–106°/4 mm., $n_D^{20}$=1.6172–1.6195, which represents a 46% yield.

*Example 9.—Miscellaneous*

By following the procedure of the above examples, the following additional combinations of reagents and quantities were studied. The yields are given in per cent of the theoretical, based on the trimethoxybutane used.

| Solvent | Aryl-amine | | 1,3,3-trimethoxybutane | Oxidizing Agent | Condensing Agent | Yield, Per cent |
| --- | --- | --- | --- | --- | --- | --- |
| | $C_6H_5NH_2$ | $C_6H_5NH_3Cl$ | | | | |
| | Moles | Moles | Moles | | | |
| Abs. alc. | 1 | | ½ | None | None | 30 |
| Abs. alc. | 1 | | ½ | nitrobenzene | do | 28 |
| Abs. alc. | 1 | | ½ | $FeCl_3.6H_2O$ | do | 60 |
| 95% alc. | 0 | 0.625 | ½ | do | $ZnCl_2$ | 73 |
| 95% alc. | 0 | 0.625 | ½ | arsenic acid | do | 23 |
| 95% alc. | | 0.313 mole p-anisidine hydrochloride | 0.25 | $FeCl_3.6H_2O$ | do | 52 |

It will be noted from the above table that while the use of a mixture of aniline hydrochloride and aniline gives very good yields, better results are obtained by using the hydrochloride alone in moderate excess (about 25% excess). Also, addition of a condensing agent, such as zinc chloride has a beneficial effect. Oxidizing agents other than ferric chloride may be employed, for instance m-nitrobenzene-sulfonic acid, or arsenic acid, or the reaction may be carried out in the absence of any positive oxidizing agents. The yields, however, are improved, in fact more than doubled, if ferric chloride is selected as oxidizing agent. The ferric chloride may be in the form of a hydrate or anhydrous. The alcohol may be absolute or 95%.

In lieu of the hydrochloride of the arylamine, the corresponding hydrobromide may be employed. The arylamine may bear inert substituents in the aryl ring, such as alkyl, alkoxy, halogen and benzo. In the last-mentioned case a 4-alkyl-naphtho-quinoline results from the process.

Many other variations in the details of procedure may be made, within the skill of those engaged in this art, without departing from the spirit of this invention.

I claim:

1. The process of preparing a 4-alkyl-quinoline, which comprises condensing a primary arylamine having at least one free ortho-position with a 1,3,3-trialkoxy-alkane in the presence of ferric chloride as an oxidizing agent.

2. The process of preparing a 4-methyl-quinoline, which comprises condensing a primary aromatic amine whose cyclic nucleus contains not more than 10 carbon atoms and which has at least one free position ortho to the amino group, with a 1,3,3-trialkoxy-butane.

3. The process of preparing a 4-methyl-quinoline, which comprises condensing a primary aromatic amine whose cyclic nucleus contains not more than 10 carbon atoms and which has at least one free position ortho to the amino group, with a 1,3,3-trialkoxy-butane in the presence of ferric chloride as an oxidizing agent.

4. A process as in claim 3, the arylamine being employed in the form of its hydrogen-halide salt.

5. The process of preparing lepidine, which comprises condensing aniline-hydrochloride with 1,3,3-trimethoxy-butane in the presence of a quantity of ferric chloride sufficient to act as an oxidizing agent, and in the further presence of a condensing agent comprising zinc chloride.

6. The process of preparing 6-methoxylepidine, which comprises condensing p-anisidine hydrochloride with 1,3,3-trimethoxy-butane in the presence of a quantity of ferric chloride sufficient to act as an oxidizing agent, and in the further presence of a condensing agent comprising zinc chloride.

7. A process as in claim 2, the aromatic amine being employed in the form of its hydrochloride.

KENNETH NIELSEN CAMPBELL.

REFERENCES CITED

The following references are of record in the file of this patent:

UNITED STATES PATENTS

| Number | Name | Date |
| --- | --- | --- |
| 1,804,045 | Zollner | May 5, 1931 |
| 1,806,563 | Prill et al. | May 19, 1931 |

FOREIGN PATENTS

| Number | Country | Date |
| --- | --- | --- |
| 548,349 | Great Britain | Oct. 2, 1942 |

OTHER REFERENCES

Utermohlen, Jour. Organic Chem., vol. 8, pp. 544–548 (1943).

Kinner et al., Berichte, vol. 69-B, pp. 16–18 (1936).